Figure 3:
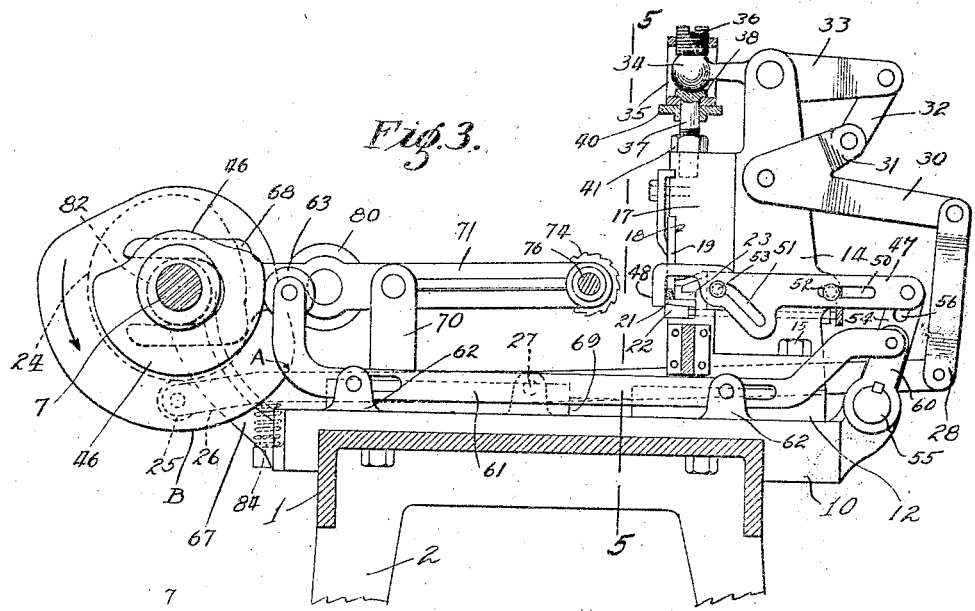

A. CARLSON.
SAW MAKING MACHINE.
APPLICATION FILED FEB. 9, 1920.
1,382,819.
Patented June 28, 1921.
3 SHEETS—SHEET 1.
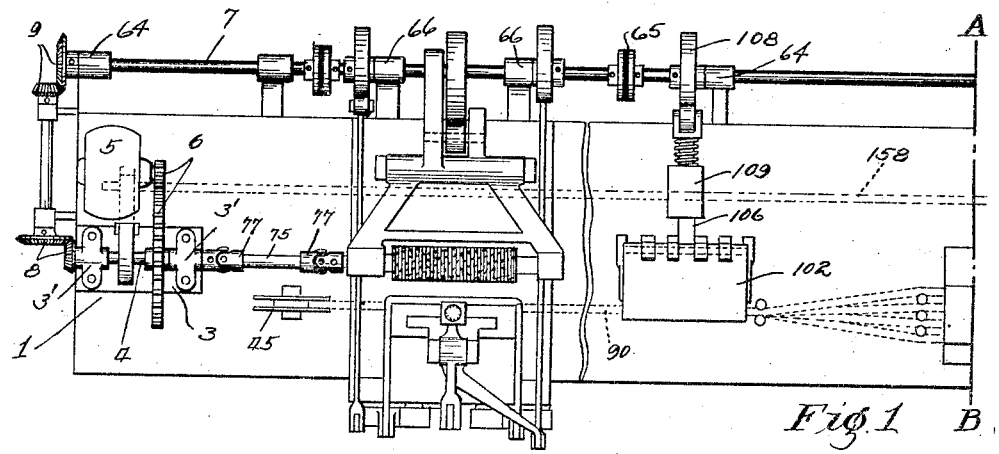
Fig. 1
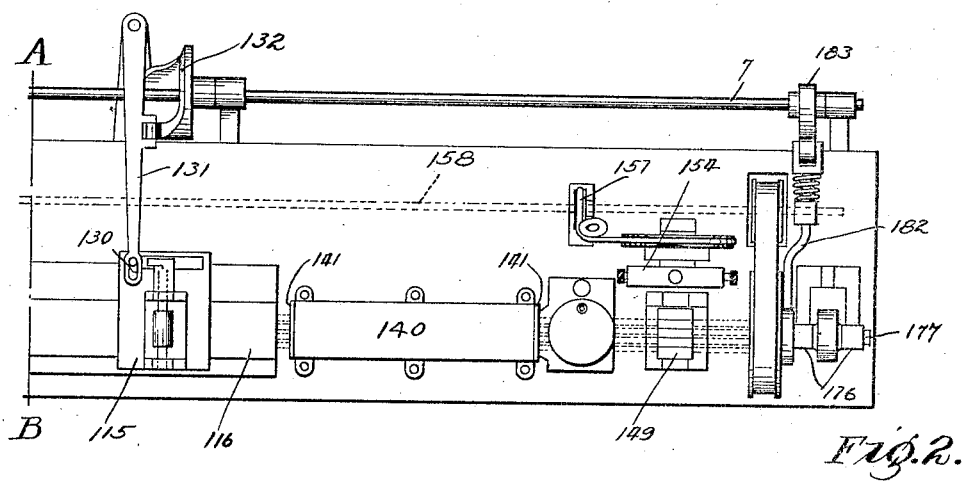
Fig. 2.
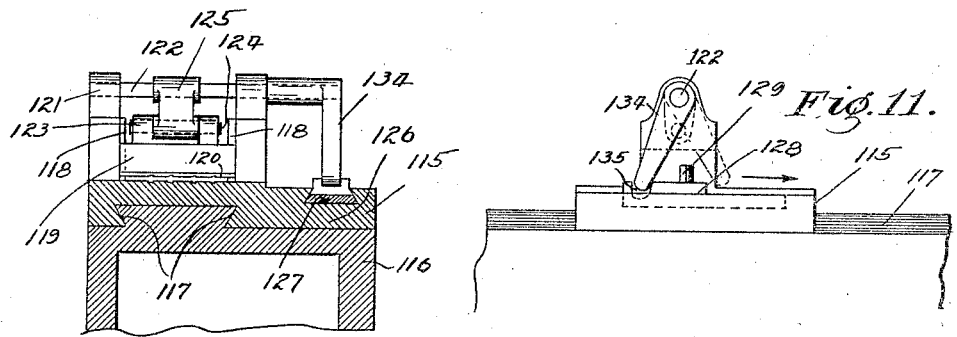
Fig. 12.
Fig. 11.
Axel Carlson
INVENTOR
BY William A. Stock
ATTORNEY

A. CARLSON.
SAW MAKING MACHINE.
APPLICATION FILED FEB. 9, 1920.

1,382,819.

Patented June 28, 1921.
3 SHEETS—SHEET 2.

Axel Carlson
INVENTOR

BY William A. Stock
ATTORNEY

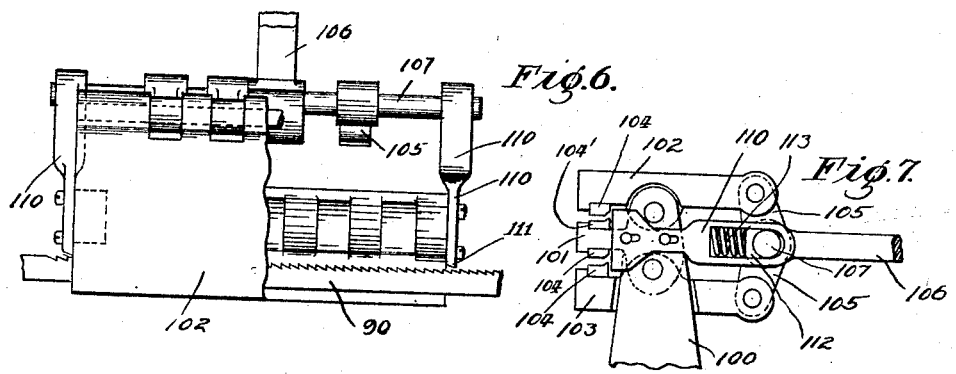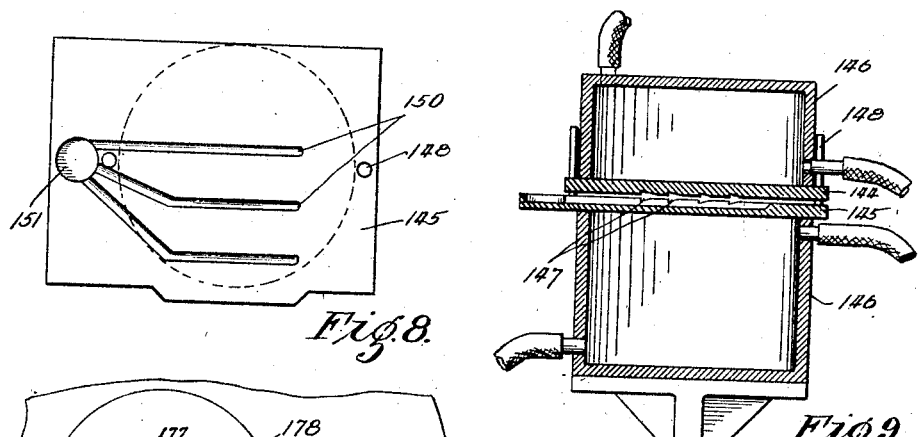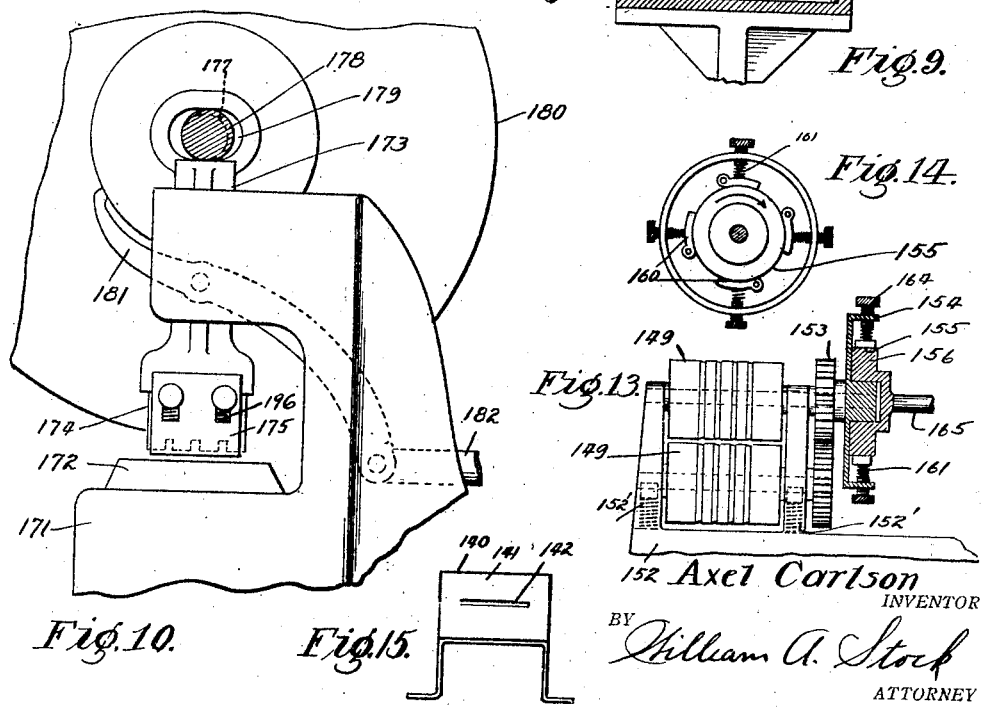

UNITED STATES PATENT OFFICE.

AXEL CARLSON, OF BERKELEY, CALIFORNIA.

SAW-MAKING MACHINE.

1,382,819.  Specification of Letters Patent.  Patented June 28, 1921.

Application filed February 9, 1920. Serial No. 357,351.

*To all whom it may concern:*

Be it known that I, AXEL CARLSON, a citizen of the United States, residing at Berkeley, in the county of Alameda and State of California, have invented certain new and useful Improvements in Saw-Making Machines, of which the following is a specification.

This invention relates to improvements in saw making machines and has as its object the construction of an automatic machine for making jewelers' saws, hack saws, scroll saws and the like.

The principal object of my invention is to provide a machine in which steel of the proper size is fed from reels in a continuous strip and by which the saw teeth are cut and set if necessary, the saw is properly heated, tempered, cut to the proper length and holes punched in the ends. A further object is to provide improved means whereby a predetermined amount of steel is fed during each cycle of operation and a still further object is to provide improved means for maintaining tension on the saw strip while the same is being heated.

With these and other objects in view, the invention consists of certain novel features of construction, combinations and arrangements of parts hereinafter described and more specifically pointed out in the appended claims: it being understood that changes in form, proportion, size and minor details of construction within the scope of the claims may be resorted to without departing from the spirit of the invention or sacrificing any of the advantages thereof.

Referring to the drawings forming a part of this specification,

Figure 1— is a view in plan of one end of my improved machine.

Fig. 2— is a continuation of Fig. 1 showing the other end of the machine.

Fig. 3— is a view in side elevation of the mechanism for holding the saw strips and cutting the teeth therein.

Figure 4:
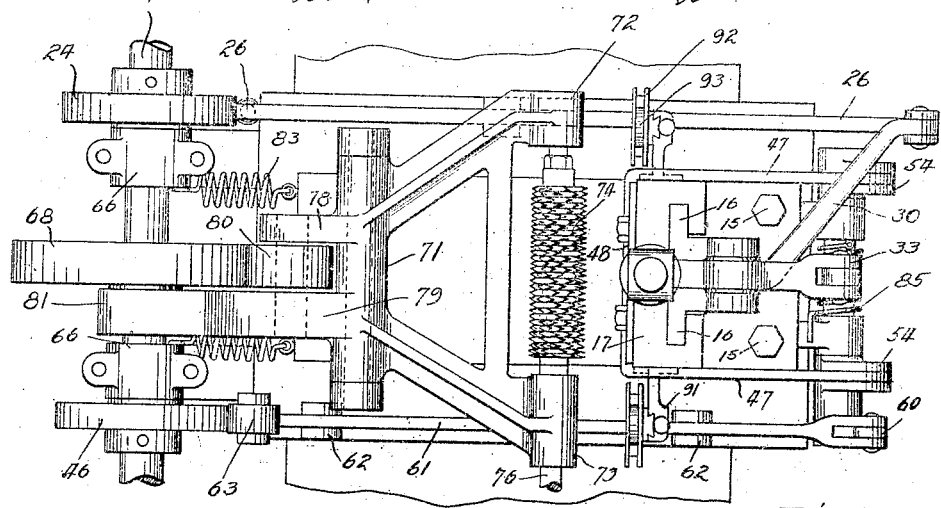

Fig. 4— is a view in plan of the same mechanism.

Figure 5:
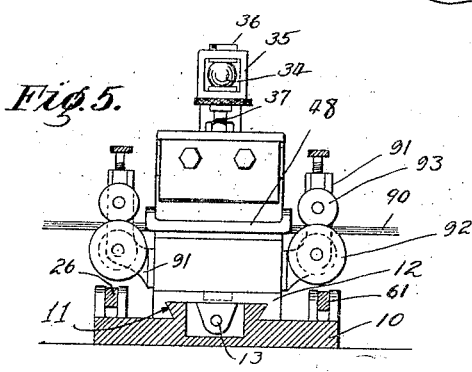

Fig. 5— is a view in section on the line 5—5, Fig. 3.

Fig. 6— is a view in plan of the mechanism for setting the teeth of the saws.

Fig. 7— is an end view of the same.

Fig. 8— is a view in plan of the lower part of the block on which the saws are hardened.

Fig. 9— is a view in vertical section through the same.

Fig. 10— is a view in end elevation of the punch by which the saws are cut from the continuous length of steel.

Fig. 11— is a view in side elevation of the mechanism for gripping and feeding the saw strips.

Fig. 12— is a view partly in end elevation of the same.

Fig. 13—is a view in side elevation of rolls for maintaining a uniform tension on the steel.

Fig. 14— is a detailed view of the holding clutch used in connection with the above mentioned rolls.

Fig. 15— is a view in end elevation of the heating furnace.

Referring to corresponding parts of the several views by the same numerals of reference, 1 denotes the main frame and bed of the machine which may be provided with suitable legs 2 in order to raise the mechanism to a convenient height above the floor. On one end of the bed is mounted a head 3 having journals 3' in which is revolubly mounted a shaft 4. This shaft is driven in any suitable manner such as an electric motor 5 which is here shown in driving connection with shaft 4 through the toothed gears 6.

Extending longitudinally of the bed, preferably in the back thereof, is a cam shaft 7 which is driven from shaft 4 by some form of reduction gearing such as the pairs of beveled gears 8 and 9.

Adjacent the head 4 is mounted the mechanism for holding the strips of steel and cutting the teeth therein which mechanism is more particularly shown in Figs. 3, 4 and 5. As here illustrated, it consists of the base plate 10 which is attached to the bed 1 and provided on the upper surface with dove-tailed guides 11. Slidably mounted on these guides is a block 12 which is adjustable longitudinally by means of the screw 13. On the upper surface of this block is a stand 14 which is held thereto by means of bolts 15 and the holes through which these bolts pass are made large enough so that the stand may be slightly adjusted so as to bring the holding jaws parallel to the axis of the cutting head.

This stand is provided with vertical guides 16 on which is slidably mounted a member 17. This member is provided with the recess 18 in its front face in which is held a renewable gripping jaw 19. Below the jaw just mentioned is positioned a coöperating gripping member 21 that is adjustable vertically by means of the wedge 22 and to permit strips of different width to be used. I provide in the rear and above the member 21, an L-shaped gib 23 the thickness of which may be varied to permit various widths of material to be used and at the same time keeping the edge on which the teeth are to be cut in a fixed relation to the cutting tool. Furthermore, this gib provides means for adjusting the outer edge of the strips to allow for variation in diameter of cutting tool.

The movable block 17 is operated by means of a cam 24 keyed to the shaft 7. This cam coöperates with the roller 25 pivotally mounted in one end of the lever 26. The latter is pivotally mounted as shown at 27 and on the other end is connected to a link 28.

A ball crank lever is pivotally mounted on the rear of the frame 14 and has the one arm 30 curved outwardly and connected to the upper end of link 28, while the other arm 31 is pivotally connected to a link 32, the opposite end of which is connected to a lever 33. The latter is pivotally mounted in the upper end of frame 14 and on its opposite end is provided with a ball 34.

35 denotes a closed frame having in its upper portion a threaded screw 36 the inner end of which is provided with a spherical seat in which fits the ball 34. The lower portion of the frame is provided with an opening through which extends a screw 37 the lower end of which is in threaded engagement with the upper end of the block 17. This screw has a head 38 which is slightly smaller than the hole of screw 36 so as to permit the screw 37 to be placed in position through this hole. Pinned to screw 36 on the under side of the frame 35 is a knurled disk 40 by which the screw may be turned. A lock nut 41 engages the thread of this screw and sets against the upper surface of block 17 and the surface of the head 38 is provided with the spherical seat which engages the under portion of the ball 34.

The strips from which the saws are cut are drawn from reels 45 which may be mounted either below the bed or on suitable brackets above the same. In order to hold these strips back against the gib 23 before the jaws grip the same, I provide the mechanism which is operated by cam 46. This mechanism consists of a U-shaped member having two side bars 47 which are identical in construction and a bar 48 connecting the forward ends of bars 47. The latter is adapted to contact with the edges of the saw strips and hold them back against the gib while the jaws are taking hold. The side bars are each provided with a horizontal slot 50 and an angular slot 51 which slots engage the guide pins 52 and 53, respectively.

The ends of bars 47 opposite those ends which are joined to the cross bar 48, are pivotally attached to arms 54 which in turn are keyed to a shaft 55 and are provided on their upper ends with slots 56 so that the connected ends of the bars 47 may have a vertical movement with reference thereto. The shaft 55 is oscillatively mounted in suitable bearings extending outwardly from the base 10 and on one end has attached a short arm 60 to which is pivotally attached one end of the sliding bar 61. This bar is movable in guide lugs 62 and has its opposite end bent upwardly to receive a roller 63 that contacts with the face of cam 46.

The cam shaft 7 is supported at intervals in journals 64 which are secured by brackets to the frame 1 and this shaft is made in several lengths, the sections of which are connected by means of flexible couplings 65.

Just back of the mechanism for cutting the saw teeth are provided two journals denoted by 66 and which are supported on the bracket arms 67 secured to the rear end of the base 10. On the shaft intermediate these journals is mounted a cam 68 the function of which is to move the cutter head into operative position.

Slidably mounted on the guide ways 11 is a block 69 provided with upwardly extending arms 70. Oscillatively mounted in these arms is a frame 71 carrying on its forward ends the bearings 72 and 73 in which is revolubly mounted the cutter head 74. This cutter head has teeth of such character that it will cut the required saw teeth and is driven from shaft through the intermediate shaft section 75 which is connected to shafts 4 and 76 by means of the universal joints 77.

This frame is provided with the rearward extensions 78 and 79 between which is revolubly mounted a roller 80 that contacts with the face of cam 68. Furthermore, the extension 79 is provided with the forked end 81 which engages an eccentric 82 which may constitute the hub of cam 68. As here illustrated the cam 68 moves the frame 71 forward and a return motion is secured by means of tension springs 83 attached to the bracket arm 67 and the block 69, respectively.

The rollers of cams 24 and 46 are held against their respective faces by means of springs 84 and 85.

The several strips of wire from which the saws are cut are denoted by 90 and on each side of the frame 14 I provide guide rollers 92 and 93 which are revolubly mounted in a bracket 91. The lower of these rollers is flanged while the upper one is adjustable vertically and of such width that it fits within the flanges of the lower roller.

Adjacent the tooth cutting mechanism just described is the toothed setting mechanism illustrated in Figs. 6 and 7. This mechanism consists of a stand 100 attached to the bed 1 and having the laterally extending arm 101 the entire length of the stand. Oscillatively mounted above and below this arm are movable jaws 102 and 103, the forward ends of which are provided with renewable setting members 104. The arm 101 is provided with coöperative renewable members 104'. The rear ends of these jaws are pivotally attached to the toggle links 105 which in turn have their opposite ends pivotally mounted on the pin 107. From the latter extends an operating rod 106 that is slidably mounted in a suitable guide 109 and operated by means of cam 108 on shaft 7.

Slidably mounted on each end of frame 100 is a bar 110, the forward end 111 of which is cut in an angular manner to conform to the outlines of the teeth of the saw. The function of this bar is to properly position the teeth in reference to the setting bars 104.

The rear end of the bar 110 is slotted and engages the end of pin 107 which extends beyond the outlines of the frame 100. Mounted in this slot is a sliding bearing block 112 and interposed between this block and the forward end of the slot is a spring 113. This construction permits the pin 107 to move forward and the pressure of the spring 113 to cause the end 111 to enter the saw teeth. The lateral pressure due to the contact between the inclined surface will shift the saw strip so as to properly position it on the member 104. The movement of the bar then stops while the pin 107 continues its forward movement and thus operates the toggle to squeeze the forward ends of the jaws against the saw teeth.

To the right of this setting mechanism is positioned the mechanism for drawing the strips forward an amount equal to the length of the saws. As here illustrated, this feed mechanism consists of a sliding block 115 which is mounted on a base 116 having the guides 117 the base itself being attached to bed 1. The block 115 has the vertical guide bars 118 in which is slidably mounted a movable jaw 119. This jaw is provided with a gripping surface 120 of slightly yielding material such as wood or hard fiber and may be provided with longitudinal grooves for saw teeth which have been set. On the upper surface of this jaw are provided ears 123 between which extends a pin 124.

The upper surface of block 115 is provided with ears 121 in which is held the pin 122 and secured to the latter between the ears is an arm 125 the lower end of which is pivotally mounted on the pin 124. Block 115 has a lateral extension 126 in which is a longitudinal slot 127 that is closed at each end. A short block 128 is slidably mounted in this slot and is provided with a pin 129 which is engaged within slot 130 in the end of cam lever 131. The cam lever 131 is operated by the cam 132 keyed to shaft 7.

Attached to pin 122 on the outside of block 115 is an arm 134 which extends downwardly in alinement with slot 127 and contacts with the ends of the recess 135 formed in the upper surface of block 128.

In the operation of this device when the cam lever 131 starts to move in the direction of the arrow shown in Fig. 11 the first result is to slide the block 128 to the left carrying with it the arm 134. This in turn presses down the gripping jaw 119 so as to effectively hold the saw strips 90. At the time these jaws have been closed the block reaches the end of the closed slot 127 and a further movement of the lever causes the block 115 to be moved horizontally on its guides 117. On the reverse movement of the cam lever the first operation is to slide the block 128 without moving the block 115 and thus to raise the jaw 119 and so release the saw strips and permit the vise to be moved in the reverse direction.

140 denotes a heating furnace preferably of the electric resistance type. The heating elements of this furnace are entirely closed and the ends provided with plates 141 having narrow slots 142 through which the saw strips find entrance and exit. This furnace is of approximately twice the length of a finished saw blade and positioned close to the exit thereof is a hardening device illustrated in Figs. 8 and 9.

The hardening blocks consist of the upper and lower cooling surfaces 144 and 145 having on the back of each a hollow tank 146 through which a cooling fluid may be circulated.

If the saws are set as are hack saws these cooling surfaces are provided with longitudinal recesses 147 to permit the passage of the teeth without their contacting with the blocks. The upper cooling member is held in suitable guides 148 and is adapted to be held on the strips passing therethrough by its own weight. The lower cooling member is provided with a series of transverse grooves 150 which are connected to a recess 151 and in use oil is dropped into this recess from a suitable container thereby providing the cooling medium for hardening the saw blades which pass between the several blocks.

Next to the cooling device is positioned a pair of rolls 149 which are adapted to maintain a continuous and uniform tension on the saw strips. These rolls are pivotally mounted on a suitable frame 152 and are constrained to rotate together by means of the toothed gears 153. One of the rolls is provided with spring means 152' for pressing it toward the other roll. One of the roll shafts has attached thereto a disk 154 having an axially extending rim in which are adjusting screws 164. Revolubly mounted in alinement with this roll shaft is a shaft 165 on which is attached a disk 156 having a smooth peripheral surface 155. Shaft 165 is continuously driven by means of a belt 157 from shaft 158. Within this disk are a number of contact shoes 160 that are pressed against the surface 155 by means of springs 161. These springs are adjustable in order to secure varying degrees of tension and frictional effort between the rotating disk and the disk on the extension shaft.

In operation this device maintains a tension on the saw strips due to the friction between the shoes and the edge of disk 156 and this friction is sufficient that when the feeding device operates the rolls will pull the saws through the furnace and cooling blocks. When the feeding device releases the strips the latter are gripped by the jaws of the tooth cutting head, when the shoes will slip and the tension on the strips will be just sufficient to permit buckling of the strips in the furnace.

After passing through the tension rolls the saw strips enter the cut off press 170. This press consists of a suitable frame 171 in which is held a die 172 and in the upper part of which is a sliding member 173 holding a punch 174. On the sides of the latter are sliding plates 175 that are pressed downwardly by means of springs 196 and which are adapted to hold the saw strips while the cutting proceeds.

The upper part of the frame 171 is provided with journals 176 and in which is revolubly mounted a shaft 177. The latter is provided with a centrally disposed eccentric 178 which works in a yoke 179 in the upper end of the slide 173.

Revolubly mounted on the shaft 177 is a continuously rotating wheel 180 in the hub of which is provided clutch mechanism for causing the shaft 177 to be rotated by this wheel. This clutch mechanism may be of any preferred type such as is usually used in punch presses and is thrown into connection by means of a lever 181 which is operated by a cam 183 on shaft 7 and which is connected to the lever by the rod 182.

As heretofore explained a continuously rotating shaft 158 extends longitudinally of the machine and is used to drive the tensioning rolls and the punch press. This shaft is driven in any preferred manner from the shaft 4 and the cam 183 is so arranged that the punch is only thrown into operation at the time when the feeding mechanism is inoperative.

Having thus described the various features of my invention the general scheme of operation is as follows: The saw material is drawn into the holding vise by means of the gripping mechanism 115. As soon as the longitudinal movement of the strips ceases cam 46 becomes operative and moves the bar 61 to the right as viewed in Fig. 3, thereby drawing up the member 47 against the forward edge of the strips and positioning them uniformly against the surface of gib 23. As soon as these strips have been properly positioned cam 24 presses downwardly on the roller 25, thereby raising the opposite end of lever 26 and through the associated levers and links causes the jaw 17 to slide downwardly and contact with the upper surface of the topmost strip 90.

The next operation is a movement to the left by bar 61 whereby the member 47 moves toward the cutter head and at the same time through the guidance of the slot 51 moves in an upward direction. Then cam 68 starts coöperating with roller 80 whereby the guide block 69 and the frame containing the cutter head is moved forwardly. This forward movement continues until the teeth of the cutter head are positioned opposite the edge of the saw strips. At that time the cam is provided with a gradually inclined surface between the points A and B whereby the cutter is slowly fed to the desired depth. At about this time the eccentric 82 is in its position of greatest movement whereby the cutter is moved downwardly across the face of the saw strips. The cutter is then returned to the left, the jaws open and the gripping mechanism 115 takes hold and pulls the saw strips a horizontal distance across to the length of one saw.

During the time one set of saws is being cut the previously cut saws are within the setting mechanism and the latter closes thereby setting the teeth.

As here illustrated, the saws as they emerge from the cutting device are separated into two equal sets, one of which is fed between the upper setting blocks and the other between the lower setting blocks. After passing through the setting mechanism the strips are fanned out into a single horizontal row and thus enter the furnace and continue through the subsequent operations.

The punch press previously described is fitted with dies which will cut off the saws with any desired shape to the ends and when necessary, punch holes in the ends.

The proportions of the machine are such that the portion of the saw strip where the cut is made lies between the exit end of the furnace and the tempering block and between the heating effect of the furnace and cooling effect of the blocks, reaches such a temperature that it does not harden when passed through the tempering blocks.

I claim as new and wish to cover by Letters Patent:

1. A machine for cutting saw blades from continuous strips of metal comprising a frame, a transversely movable cutter head carried thereby, a clamping mechanism comprising a movable jaw for clamping a plurality of saw strips, a member movable at right angles thereto for alining the edges of said saw strips and means for feeding said strips.

2. A machine for cutting saw blades from continuous strips of steel comprising a clamping mechanism composed of jaws for exerting a transverse pressure against said strips, means for positioning said strips in an edgewise direction, a rotatable cutter head and means for bringing said head into contact with the edges of said strips and means for imparting a transverse movement to said head while in contact with said strips.

3. A machine for forming saw blades from continuous strips of steel comprising a clamping mechanism for said strips, a feed mechanism for moving said strips the length of one blade, a cutter and means for moving said cutter transversely across the edges of said strips while in their clamped position.

4. A machine for forming saw blades from a plurality of continuous strips of steel comprising a feed mechanism an adjustable member on which rests the lowermost of said strips, means for alining said strip laterally, means for clamping said strips, means for removing said alining means and a cutter head adapted to move transversely across the edges of said strips to cut teeth therein.

5. A machine for forming saw blades from a plurality of superimposed continuous strips of steel comprising a gripping mechanism, a feed mechanism operative when said gripping mechanism is released, an alining device for alining the edges of said strips while said gripping mechanism is released, a rotary cutter head adapted to move transversely across the edges of said strips, and means for removing the alining device out of the path of said cutter head.

6. A machine for forming saw blades from a plurality of continuous strips of steel comprising a gripping mechanism a feed mechanism operative when said gripping mechanism is released, a bar movable against the edges of said strips for the purpose of alining the same, a rotatable cutter head, means for moving said head transversely across the edges of said strips; and means for removing the said bar after said gripping mechanism becomes operative and before said cutter is moved as aforesaid.

7. A machine for forming saw blades from a plurality of continuous strips of steel comprising a clamping mechanism, means for alining said strips in an edgewise direction, a cutter for forming the teeth, means for moving said alining means out of the path of said cutter and means for moving said cutter transversely across the edges of said strips.

8. A machine for forming saw blades from continuous strips of steel comprising a clamping mechanism for said strips, a cutter and means for moving said cutter transversely across the edges of said strips while in their clamped position.

9. A machine for forming saw blades from a plurality of continuous strips of steel comprising an adjustable member on which rests the lowermost of said strips, means for alining said strip laterally, means for clamping said strips, means for removing said alining means and a cutter head adapted to move transversely across the edges of said strips to cut teeth therein.

10. A machine for forming saw blades from a plurality of superimposed continuous strips of steel comprising a gripping mechanism, an alining device for alining the edges of said strips while said gripping mechanism is released, a rotary cutter head adapted to move transversely across the edges and means for removing the alining device out of the path of said cutter head.

11. A machine for forming saw blades from a plurality of continuous strips of steel comprising a gripping mechanism a bar movable against the edges of said strips for the purpose of alining the same, a rotatable cutter head, means for moving said head transversely across the edges of said strips, and means for removing the said bar after said gripping mechanism becomes operative and before said cutter is moved as aforesaid.

In testimony whereof I affix my signature.

AXEL CARLSON.